Patented July 4, 1933

1,917,038

UNITED STATES PATENT OFFICE

LEMUEL R. JONES, OF PETERSBURG, VIRGINIA

PLASTIC PRODUCT AND PROCESS OF PRODUCING SAME

No Drawing. Substitute for application Serial No. 51,509, filed August 20, 1925. This application filed June 19, 1929. Serial No. 372,227.

The invention relates to plastic products and processes of forming the same and more particularly to products formed from crude vegetable material containing large percentages of carbohydrates, preferably containing one or more forms of cellulose, the material thus embracing such substances as peanut hulls, oat hulls, corn-cobs, cotton seed hulls, wood shavings and the like, which may be referred to briefly as crude vegetable materials containing a variety of celluloses, and also to other carbohydrate material which may consist largely of pure cellulose such as cotton, it also being possible to utilize other carbohydrate material which contains little, if any, cellulose. The application is identical with my application Ser. No. 51,509, filed August 20, 1925, and allowed December 3, 1927, which it replaces.

The products formed by the invention may comprise compositions, preferable in powdered form, which are adapted to be molded under heat and pressure to produce hard coherent bodies, which are mostly infusible and insoluble to a considerable extent, suitable for many of the uses to which such substances as bone, celluloid, shellac, hard rubber, phenol condensation products and other plastics are put. The products of the final reaction are also included within the invention.

It should be noted that the product may be formed in accordance with the invention, not only from materials containing a variety of celluloses, such as peanut hulls, etc., but also from cotton, which is chiefly pure cellulose, and also that some forms of the product may be made from materials containing little or no cellulose of any kind, such as corn meal. In some forms of the invention, a powder or material desirable for molding purposes is formed, which comprises a binding material of resinous nature intermixed with a fibrous filler, both binder and filler being formed from the original ingredients, without the necessity of first forming a separate resin and then adding a filler thereto. In another form of the invention, by varying the proportions, a resin may be separated out from the fibrous material, this being useful for varnish or other purposes to which a fusible or soluble resin may be put. The formation of the product is thought to proceed, from one form of carbohydrate or another, through a series of transformations, very possibly by breaking down, by the aid of oxidation, from more complex to simpler forms. Condensation products, in the nature of furfural resins, are apparently formed, but furfural as such does not seem to be isolated at any stage of the process. The reactions involved are complex and are difficult of exact determination.

Objects of the invention comprise the provision of novel processes of a simple and effective nature for the production in a comparatively inexpensive manner of plastic materials of the kind referred to. Other objects comprise the production of various useful substances as by-products, as will be explained hereafter.

Other objects of the invention consist in the provision of novel products, of novel processes and process steps, all as will be more fully set forth in the following specification and be more particularly pointed out in the appended claims.

The invention will be particularly described in connection with the treatment of peanut hulls, it being understood that other crude vegetable materials of the kind indicated above may be used with the production of similar results.

The invention comprises a process or processes which may be carried out in various modified forms, all of which, however, utilize, or preferably utilize, certain steps in common. One of the salient features of the invention, as the same is now understood by me, consists in the production from vegetable material of the class noted of a molding composition which may be hot-molded to produce a final hard body, apparently of a resinous nature, this molding composition being characterized by its substantial freedom, so far as is indicated by the recognized tests, from uncombined acids which would be likely to attack a metal mold and which would be likely to render a hot-molding process uncertain or unreliable. The molding compound referred to, in its preferred form, is also characterized by its substantial freedom from water soluble substances and from substances which tend to volatilize in the neighborhood of 100° C.

To first briefly describe the various forms in which the process may be practiced within the invention: in one form of the invention, peanut hulls or other crude vegetable material may be cooked in a closed vessel with cresol or phenol or similar body together with a proportion of a supplementary body such as an acid or a salt of a suitable acid. The cooking is continued until a blackened, partially disintegrated mass is produced which is somewhat sticky. This product is the result of reactions, the exact chemical natures of which are not exactly known. The product at this stage cannot apparently be molded under heat to produce a useful product which will be insoluble and resistant to heat. It contains uncombined organic acids such as cresylic, and inorganic acids such as hydrochloric, if used or formed in the process, which would tend to attack the mold if the material was hot-molded in its then state.

I preferably utilize this material by reducing it to a powder, preferably by grinding the same under water, this being followed by boiling for a sufficient length of time. Various water soluble products go into solution in the water during the wet grinding process and the subsequent heat treatment, such as boiling results in freeing the comminuted product from excess acid and various volatile substances. It is possible that certain condensations may take place during the wet grinding, or the boiling, or both. The material is then further washed to remove the acid or acids as completely as possible and is dried.

The products as thus described may, for example, be formed with the aid of hydrochloric acid as the catalytic or oxidizing agent referred to above. The product thus formed can be hot-molded as in the usual hydraulic press to produce material which is useful for many of the purposes to which plastics are put. It may, however, be improved by the addition thereto of a limited amount of hexamethylenetetramine or other bodies containing the methylene radical, or equivalent hardening reagent, or by the addition of other substances as will be described hereinafter, in which case the resistance of the product finally formed in the mold to heat or boiling water or alkalis or solvents will be greatly improved.

In place of a mineral acid, such as hydrochloric acid, I find that I can use aniline hydrochloride, or a mixture of aniline oil and hydrochloric acid, in which case an improved product results. In this case no hardening agent, such as the hexamethylenetetramine need be added to the molding powder, and the material will be formed in the mold under heat and pressure to a final product which stands a comparatively high temperature without changing shape or form and which does not disintegrate in boiling water for a reasonable length of time. This product also resists hydrochloric acid and weak sulphuric acids and treatment with weak alkalis, for a considerable time. This material is also substantially insoluble in the usual commercial solvents such as alcohol, benzol and gasoline for a substantial length of time.

The process may also be carried out by the substitution of benzol for cresol, that is to say the vegetable material may be cooked with benzol, in which case hydrochloric acid or other mineral acid should apparently be added. In this case the same series of steps as has been described above is followed and the molding mixture thus produced may be molded under heat and pressure without the addition of hexamethylenetetramine or any other hardening agent to produce a product which is heat and solvent resistant to a marked degree.

Also, the process just described may be modified by the use of benzol with a less proportion of cresol in addition, in which case the product seems to mold particularly well without sticking and produces a final product similar to that just described.

It may be noted at this point that various bodies may be added to the product before molding which tend to produce a harder final product. Among such substances may be noted calcium carbonate, barium carbonate, gypsum, sodium carbonate, etc. It may be noted that the addition of such substances to the product increases the value of the latter for electric insulating purposes.

In one further modification or form of process a plastic may be formed in a particularly simple and economical manner; in accordance with this form of the invention the vegetable materials such as peanut hulls, etc., are simply mixed with a strong acid, preferably sulphuric acid, and the mixture allowed to stand in the open air, or in a modified form of process, subjected to a cooking operation. A blackened product is thereby formed as a result apparently of the oxidation of the vegetable material. This product is then ground under water to a fine powder, the water preferably drained off and the powder given several washes to remove excess sulphuric acid. After this the washed powder is boiled or otherwise heat-treated, in the same manner as has been described in the other modifications of the invention and after the boiling the product is washed with water until it is practically acid free to the phenothalein test. The remaining powder is dried and may be molded under heat and pressure. The molded product will stand a comparatively high degree of heat, and is insoluble in the usual solvents, and is very resistant to acids and alkalis.

Another modified form of process and product to be briefly discussed at this point may be practiced by using a larger proportion of acid or of cresol or the like, or of both, than is employed in a process such as is first described herein in which a molding powder is formed from the vegetable material with cresol and an acid. By the use of an excess of hydrochloric acid, for example, a resin may be precipitated out during the boiling stage, or to some extent during the wet grinding stage, if desired, particularly if the wet grinding is performed with hot water. This product is a soluble and fusible resin which may be dissolved in alcohol or other solvents, and used as a varnish or for other purposes.

I will now describe the processes referred to above in somewhat greater detail. Referring, first to the process in which the vegetable product is mixed with cresol or the like, proportions which I have found to be suitable for the process comprise two parts of peanut hulls or other waste woody product, from one to one and one-half parts of cresol and from ⅜ths to ⅝ths of one part of hydrochloric acid (of commercial strength and purity), by weight. It should be understood that the proportions and temperatures which are now being given are given by way of example and not by way of limitation. The mixture just described may be cooked in a closed vessel from three to five hours at a temperature of 90° C. to 110° C., or at a lower temperature for a longer time.

The product thus formed is black and gummy at the end of the heating but upon cooling it loses its stickiness and becomes brittle.

This body is fusible to the extent that it softens more or less under further heat treatment and it is readily soluble in alcohol and other solvents. This material cannot readily be transformed by a simple heat treatment into an infusible, insoluble product. This product contains an excess of cresol or similar body which in accordance with my invention must be removed. In accordance with the form of the process which I now deem preferable this material is ground to an extremely fine powder under water, as stated above, various water soluble substances going into solution during this wet grinding step. Excess cresol and phenolic derivatives thus go into solution to a greater or lesser extent together with other bodies. This wet grinding step may be carried out with the use of either hot or cold water, preferably water at room temperature.

The powder resulting is now boiled, either in the same water in which it has been ground or in fresh water, the boiling step suitably continuing for a period of 3 to 4 hours at atmospheric pressure in an open vessel, or with a reflux condenser, or other apparatus for saving the condensate. During the boiling excess cresol comes off along with various other volatile substances at about 100° C. It seems probable that various other products contained in the powder go into solution in the water during the boiling process, some of these substances apparently being phenolic derivatives.

At the conclusion of the boiling step the powder is dried, preferably under heat which may be gradually increased to, say, 125° C. or 130° C. until the product is thoroughly dried. The product which is now substantially acid free so far as may be observed by the phenothalein test may be placed in the mold or it may be placed in closed containers for use in the mold at a subsequent time. The molding powder thus formed may be hot molded, being subjected to heat of say 165° C. to 185° C. and to pressure in a hydraulic press for a suitable length of time, say 10 minutes.

As has been stated above, the product which has just been described is considerably improved by the addition thereto, before molding, of a material adapted to increase the hardness and infusibility of the product. As stated, this may be hexamethylenetetramine, or paraformaldehyde in which case from 5 to 10% on the weight of the molding powder may be incorporated with the mass after the drying step, provided that this material be thoroughly intermixed with the powder. When this hardening material has been added the final molded product will not soften or change color in boiling water.

It may be noted in this connection that in the processes described there is under some circumstances no necessity for adding a filler to the molding mixture in contradistinction to the usual practice in the making of plastics from phenol-formaldehyde condensation products and the like. In the processes here described the fibrous or cellulose, or cellulose-like materials are not removed and may be only partially chemically changed and are still apparently present to greater or lesser extent in the powder which is to be molded, this material being accompanied by decomposition products which are adapted to act as a binder for the more or less unreacted material during the molding process. The effect of a fluxing agent, therefore, which renders more fluid the portion of the mass which is adapted to flow, is to cause the resinous or other more or less fluid material to cover and serve to bind together more fully the more or less undecomposed and more or less inert portions of the original vegetable material, whereby it acts more efficiently to bind the mass into a strong or coherent body.

To refer now to various details of a modified form of the process: The process described above in detail may be modified by the substitution of aniline hydrochloride or of aniline hydrochloride plus hydrochloric acid, or of aniline oil plus hydrochloric acid, for the hydrochloric acid given in the above example. Thus, for example, we may mix together 2 parts of the peanut hulls with from 1 to 1½ parts of cresols and with ⅜ths to 1 part, by weight, of aniline hydrochloride, or ¼ part aniline hydrochloride plus ¼ part hydrochloric acid, in place of the aniline hydrochloride above, or in place of the aniline hydrochloride from ⅛th to ¼th of 1 part of aniline oil with from ⅜ths to ½ of 1 part of hydrochloric acid, by weight, may be used. With the aniline oil plus hydrochloric acid a period of cooking of from 5 to 10 hours in a closed vessel at from 90° to 110° C. has been found to put the material in proper condition for the wet grinding, boiling and washing steps previously described. With aniline hydrochloric alone a considerably longer period, such as one of about 30 hours for the cooking step, has been found necessary in some cases. With the aniline hydrochloride plus hydrochloric acid the time of cook may be materially reduced.

The molding product formed with the use of the aniline hydrochloride or the aniline oil plus hydrochloric acid as noted, may be hot pressed to produce a molded article which has considerable hardness and which has the other desirable properties noted above in regard to infusibility and insolubility and resistance to heat, these results being achieved without any added methylene containing hardening agent and without the addition of hardening agents such as calcium carbonates mentioned above, and additions of such substances are thought not necessary with this material.

In the next modification of the process referred to in which benzol is used in place of cresol or the like, it should be noted that a smaller proportion of benzol than is used in the case of cresol seems to give the best results. By way of example, from ¾ths of 1 part to 1 part benzol with 2 parts of peanut hulls and from ¾ths to 4 parts of hydrochloric acid or comparatively strong sulphuric acid such as sulphuric acid of over 40° Baumé strength, the hydrochloric acid used being preferably of commercial strength and purity. The above formula may be varied with excellent results by the addition of a small proportion of cresol, or cresylic acid or the like to the above formula. Thus ¼th to 1 part of cresol, by weight, may be added to the ingredients noted above.

In either of the two cases just mentioned, the time of cook in the closed vessel may be from 3 to 5 hours at from 90° to 110° C. after which the grinding, washing and boiling steps, and drying and hot-molding are carried out exactly as described above. In this case the molded product will be substantially infusible without the addition of hexamethylenetetramine or other hardening agent to the molding composition. The product molds well, particularly when the small proportion of cresol is added and seems to be a desirable process because of the relative cheapness of the benzol.

In regard to the variation of the process which was last described in the peliminary discussion herein, namely, that in which the vegetable material may be simply treated with an acid, without the initial cooking, it may be noted that this process may well be carried out by using equal parts, by weight, of sulphuric acid and peanut hulls, but preferably larger proportions of acid are used, as for example, 2 parts of hulls with 3 parts of acid. The acid may, for example, be 60° crude sulphuric acid. The process may, for example, be carried out as follows. The hulls are preferably first wetted, with steam or water, and permitted to absorb this moisture, the water preferably being added within comparatively narrow limits, such as 10 to 40 percent based on the dry weight of the hulls. Sufficient time for seasoning should be allowed, which may require 1 to 2 days if water is used, or a much less time if steam is used. The moisture should be applied to the hulls in the unground condition of the latter. The acid is applied to the wetted and seasoned hulls while the latter are still unground, the purpose being to merely apply the acid as a coating on the surfaces of the hulls, rather than to force the same into the hull structure, or to apply it to the surfaces of small particles. The object of the wetting is to retard the reaction and develop slow heating. The same effect may be obtained by working with a weaker concentration of acid, but the procedure noted is preferred.

The hulls with applied acid are allowed to stand in the open, in the preferred method, for a sufficient period of time, the material blackening almost immediately if strong acid is used, and heat developing within the mass. I have found good results to be obtained when this step of the process was allowed to continue, for example, for 30 hours, without addition of heat. The blackened material is then wet-ground in a ball mill to a fine powder. The water is then preferably drained off, for example, through filter paper and the powder is washed two or three times until the excess sulphuric acid has been removed. The powder is then boiled in water for a period which may, for example, be 3 hours under atmospheric pressure. The powder is then washed with water until it is acid free to the phenothalein test. The remaining powder is dried in the manner previously described and placed in the mold and pressed under heat producing a plastic which has properties that have been noted above.

It should be noted that in the above described process which is the preferred method of carrying out this particular form of the invention, it is deemed desirable to hold the reaction within certain desirable limits. If the hulls are ground before the acid is applied thereto, the action is usually too rapid for the production of desirable products. Also, if the hulls are made too wet before the acid is applied, the resulting product is apt to be deficient in the proportion of binding material formed.

While, as stated, the acid treatment is preferably employed in place of the cooking step which has been described in connection with other forms of the process, it should be understood that the cooking step is not necessarily excluded from the practicing of the form of process herein described, since it is possible to give the material a cooking step, with externally applied heat, at the end of the step in which the acid is applied, this cooking step being of longer or shorter duration, after which the wet-grinding and boiling and other steps, as above described are applied.

Another modification of the form of process now under discussion consists in forming two batches of acid treated material in one of which the material such as peanut hulls, for example, is somewhat under-reacted, because, for example, of the use of an excess of moisture before the application of the acid, or by the use of too weak an acid, while in the other batch the reaction has been carried to a stage which may be considered as somewhat of an over-reaction, this material being very possibly unsuitable for molding operations by itself. These two batches having been obtained and the properties of the same noted, they may be added one to the other in desirable proportions in accordance with the stage of reaction in each and the combined product is then subject to the grinding and subsequent steps as above described.

Referring now to the resinous product which, as noted above, may be separated out from the mass during the wet grinding or the boiling stage, this may be formed, for example, as follows. Starting for example with 1 part of the vegetable material, 2½ parts of cresol and 1 part of hydrochloric acid, these ingredients are mixed and subjected to the cooking step as described in the first form of the process of making a molding powder. The wet grinding step follows the cooking step and this is followed by the boiling as above described. A resinous body will be found to precipitate out of the mass during the boiling step, or if desired during the wet grinding step, or both. It is believed that the material which is only partly reacted during the cooking step is hydrolyzed during the boiling process and also during the attrition of the wet grinding step, particularly if hot water is used in the grinding, with the simultaneous precipitation or expulsion from the mass of a resinous material. This resin is a fusible and soluble body as stated, which may be dissolved in a suitable solvent such as alcohol and used for varnish purposes with the production of a varnish coating therefrom of desirable properties. A hardening agent for this resin, soluble in the solvent used, such as hexamethylenetetramine, may of course be added to the resin in desirable proportions, in case it is desired to bake the varnish coating when obtained to produce an infusible and insoluble coating.

It may be noted that this precipitated resin may be formed when the vegetable material used consists wholly or almost wholly of pure cellulose as in the case of cotton, or when the vegetable material comprises the various celluloses or pseudocelluloses as in the case of peanut hulls or the other woody or pentose containing materials noted, and also that the precipitated resin may be obtained when a carbohydrate body is used containing very little, if any, cellulose as in the case of corn meal. For example, cotton may be substituted for the peanut hulls in the example just given. The following are examples of proportions when corn meal is used. 1 part corn meal, 2½ parts cresol, 1 part hydrochloric acid, by weight. Second, 2 parts corn meal, 1½ parts cresol, 1 part hydrochloric acid, by weight. In all of these cases a considerable proportion of resin may be recovered. It should also be noted that, when a fibrous vegetable material is used, such as cotton or peanut hulls or the like, a residue remains after the gum has precipitated out and this residue may be utilized as a molding composition, being dried after the boiling step and placed in the molds as described above. By increasing the proportion of hydrochloric acid or the cresylic body, it may be possible to increase the yield of precipitated resin and correspondingly decrease the proportion of the remaining moldable material.

It should be noted that in various of the processes described above a by-product may be obtained from the soluble matter contained in the water in which the product resulting from the first cook has been ground, boiled and washed. The residue from this liquor after evaporation of the water is a black tarry paste which I have found useful for various purposes. It may be used as a binder for powdered coal in forming briquettes or for the purposes of a binder in other cases in which the fact that the material is water soluble is not detrimental. As a binder for coal briquettes it has the advantage that it will not smoke, in contradistinction to various tarry substances which have been proposed.

A further useful application of this residue is in the making of tanning extract therefrom. It has been found that the residue referred to will precipitate gelatine and answer to other tests for tannins.

The above noted results are obtained both with the products in which cresol is used and those in which benzol is used, but more markedly so in the case of the product formed by the use of benzol. When a small amount of lead acetate solution has been dropped into the wash water from a peanut hull benzol-sulphuric acid cook, a white percipitate is formed, which is similar to the result which is obtained when the same substance is added to a bark extract suitable for tanning. Also, after the lead acetate solution has been added, it is noted that the liquor has the characteristic odor of an oak bark tanning extract. This tanning extract may be applied to the tanning of cowhide, etc., and also may be used for mordanting dyes, and being a by-product which otherwise would be thrown away, it may, of course be produced cheaply for the purposes noted. The material, when used as a tanning extract, may, of course, be mixed with other known tanning extracts for various purposes with a consequent reduction in cost. The wash liquor may also be fractionally distilled, if desired, and various cresylic bodies recovered.

It may be noted that the residue referred to above which may be applied to useful ends, amounts to a considerable percentage. The molding powder produced as the direct result of the process may be in varying percentages in accordance with the different forms of processes used, but may be stated roughly to be in the neighborhood of 50% of the weight of the initial ingredients, or up to approximately 100% of the weight of the vegetable material used in the process, it being understood that these figures apply only to processes in which the purpose is to produce a molding powder without the formation of a precipitated resin.

The finally hardened materials formed in the mold by the various processes described have the properties in regard to heat resistance, infusibility and insolubility which have been noted above, the properties of the finally cured materials made with cresol and aniline, with benzol, and with benzol-cresol, all without added hardening agent, and the cresol-hydrochloric acid product with added hexamethylenetetramine, all being similar. It may likewise be noted that all of these products, including the one in which the hulls are simply treated with sulphuric acid as a first step, are found to possess good mechanical strength and have resistance against breaking analogous to that of the well known phenol-formaldehyde condensation products in the form in which the same commonly appear on the market, that is, in which the condensation product contains a considerable amount of wood flour or other filler. The material machines in much the same way as the well-known phenol condensation products. The material takes a good finish and its properties as an electric insulator are good.

It may further be noted that all of the molding materials described are fusible, before the final heat treatment in the mold, but that they are not all alike in solubility. The cresol-hydrochloric acid product is freely soluble, and the aniline oil-hydrochloric acid, aniline hydrochloride, and aniline hydrochloride with cresol products, are readily soluble, in their molding powder condition, whereas the sulphuric acid with peanut hulls, and the hulls with benzol, are practically insoluble in ethyl or methyl alcohol, or acetone, and the benzol-hulls sulphuric acid product with added cresol is only slightly soluble, these remarks applying to products made with the proportions cited in the various examples given above. All of the products described, in their finally molded and hardened condition are quite highly resistant to heat, not softening perceptibly, for example, at temperatures above that at which hard rubber softens markedly.

The reactions ensuing during the various steps of the process are apparently extremely complex and no attempt will be made to definitely explain the same herein, further than has somewhat tentatively been done above. It is noted that the boiling step which has been described is believed to be an especial efficacious method of removing the free acids and volatile substances referred to and it appears likely that chemical and/or physical changes take place in the material during this step, but other methods of heat treatment may be used for this purpose.

It should, of course, be understood that the invention is not limited strictly to the exact steps which have been particularly described by way of example, the invention being thought to be of considerable breadth of scope and entitled to considerable range of equivalents. It should, of course, be understood that where reference is made to cresol or cresylic bodies, that phenol and phenolic bodies are included, and that crude cresol or cresylic acid may be used, as well as other crude cresol-containing substances, and that reference in the claims to "a phenol", or the like, should be taken to include both phenols and cresols, etc.

While I have described my invention in considerable detail with respect to the preferred methods or processes for performing the same, it will be understood by those skilled in the art after understanding my invention, that various changes and modifications may be made without departing from the spirit and scope of the invention and I aim in the appended claims to cover all such modifications and changes as come within the spirit of the invention.

What I claim as new and desire to secure by Letters Patent is:

1. A process of producing a plastic product, comprising, heating a fibrous carbohydrate-containing vegetable material with a phenol and a mineral agent, with a greater proportion of the vegetable material than of the phenol, and continuing the treatment until a sticky, gummy, only partially disintegrated mass is produced, finely dividing such product, and removing substantially all water-soluble substances and uncombined acids therefrom.

2. A process of producing a plastic product, comprising, heating a fibrous carbohydrate-containing vegetable material with a phenol and a mineral agent, with a greater proportion of the vegetable material than of the phenol, and continuing the treatment until a sticky, gummy, only partially disintegrated mass is produced, grinding the product in the presence of water, and removing water-soluble substances and uncombined acids therefrom.

3. A process of producing a plastic product, comprising, heating a pentosan-containing material with a phenol and a mineral agent, with a greater proportion of the vegetable material than of the phenol, and continuing the treatment until a sticky, gummy, only partially disintegrated mass is produced, grinding the product in the presence of water, and removing water-soluble substances and uncombined acids therefrom.

4. A process of producing a plastic product, comprising, heating a carbohydrate-containing vegetable material with a phenol and a mineral agent, with a greater proportion of the vegetable material than of the phenol, and continuing the treatment until a sticky, gummy only partially disintegrated mass is produced, grinding the product in the presence of water, boiling the powder, and washing the same.

5. A process of producing a plastic product, comprising, heating a carbohydrate-containing vegetable material with a phenol and a mineral agent, with a greater proportion of the vegetable material than of the phenol, and continuing the treatment until a sticky, gummy, only partially disintegrated mass is produced, grinding the product in the presence of water, removing the water, and boiling the powder in fresh water.

6. A process of producing a plastic product, comprising, heating a fibrous carbohydrate-containing vegetable material with a phenol and a mineral acid agent, continuing the treatment until a sticky, gummy, only partially disintegrated mass is produced, finely dividing the product, and removing substantially all water-soluble substances and uncombined acids therefrom.

7. A process of producing a plastic product, comprising, heating a fibrous carbohydrate-containing vegetable material with a cresol and a mineral acid substantially in the proportion of 2 parts of the vegetable material, from 1 to $1\frac{1}{2}$ parts of cresol, and the acid from 20 to about 60 per cent by weight of the cresol, continuing the treatment until a sticky, gummy, only partially disintegrated mass is produced, finely dividing the product, and removing substantially all water-soluble substances and uncombined acids therefrom.

8. A process of producing a plastic product, comprising, heating a fibrous carbohydrate-containing vegetable material with a phenol and a mineral agent, with a greater proportion of the vegetable material than of the phenol, and continuing the treatment until a sticky, gummy, only partially disintegrated mass is produced, finely dividing the product, and removing substantially all water-soluble substances and uncombined acids therefrom, and mixing with hexamethylene tetramine, to form a material adapted to be molded under heat into a hard, coherent body.

9. A process of producing a plastic product, comprising, heating a fibrous carbohydrate-containing vegetable material with a phenol and a mineral acid agent, continuing the treatment until a sticky, gummy, only partially disintegrated mass is produced, finely dividing the product, and removing substantially all water-soluble substances and uncombined acids therefrom, and mixing with a methylene-containing hardening agent to form a material adapted to be molded under heat to form a hard, coherent body.

10. A process of producing a plastic product and also a liquor suitable for tanning, comprising heating a carbohydrate-containing vegetable material with a phenol and a mineral acid agent, in a closed vessel, continuing the treatment until a sticky, gummy, only partially disintegrated mass is produced, grinding the product in water, heating the same, removing the comminuted mass from the water, and recovering the liquor remaining after the comminuted mass has been removed.

11. As a new article of manufacture, a partially disintegrated fibrous mass, comprising a reaction-product of a carbohydrate-containing vegetable material and a phenol, characterized by the facts that it assumes a dough-like consistency when heated, and never becomes thinly fluid, that it is potentially reactive, and is substantially free from free acids, volatile matter and water-soluble products.

In testimony whereof I have signed my name to this specification.

LEMUEL R. JONES.